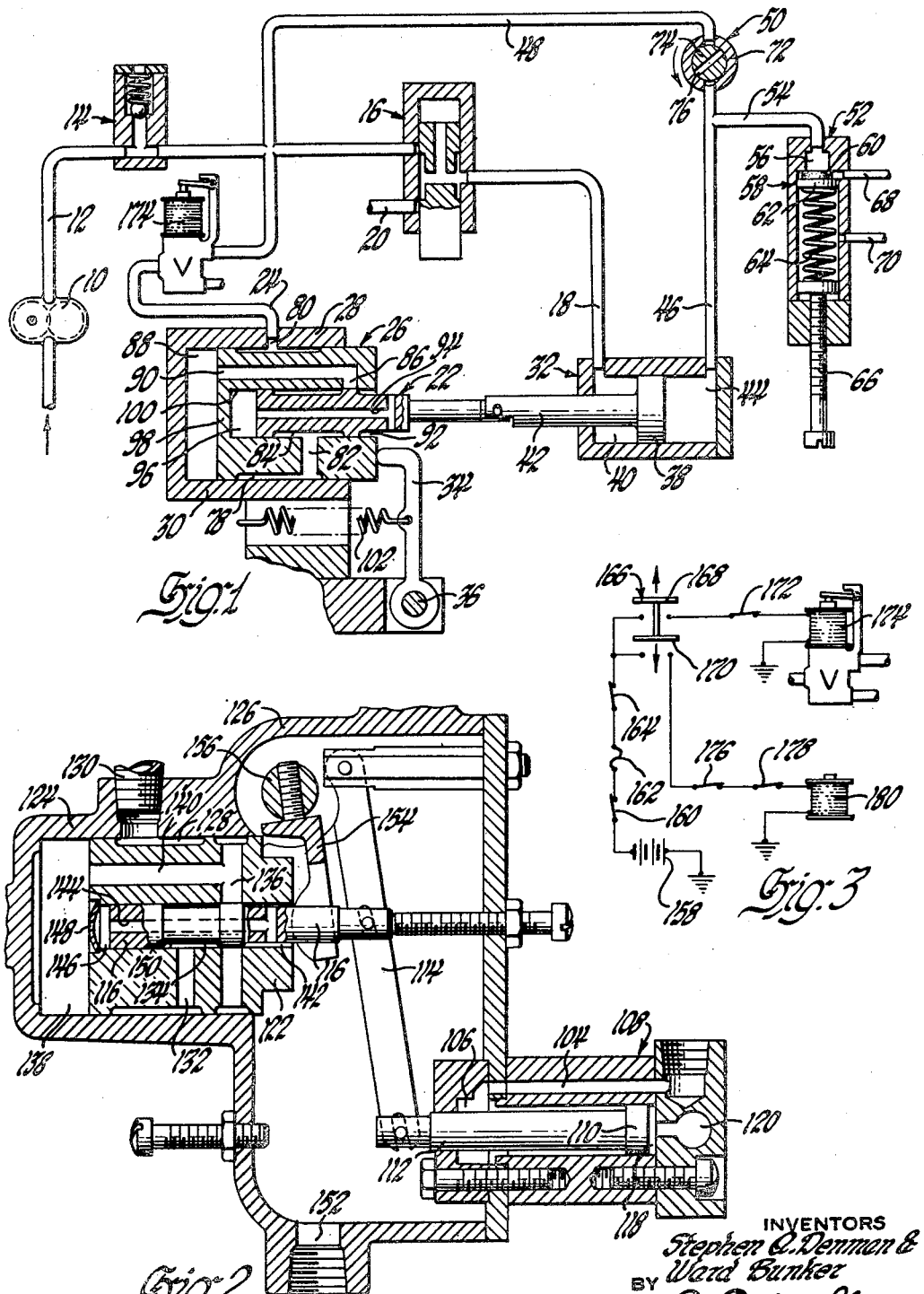

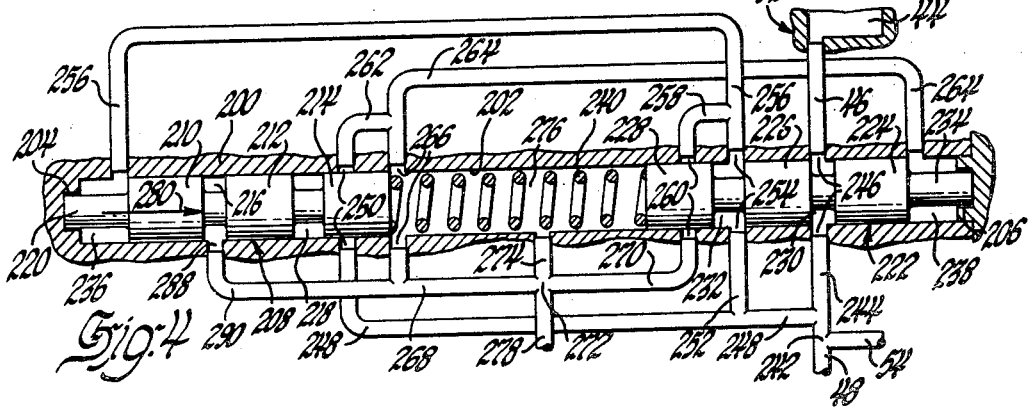
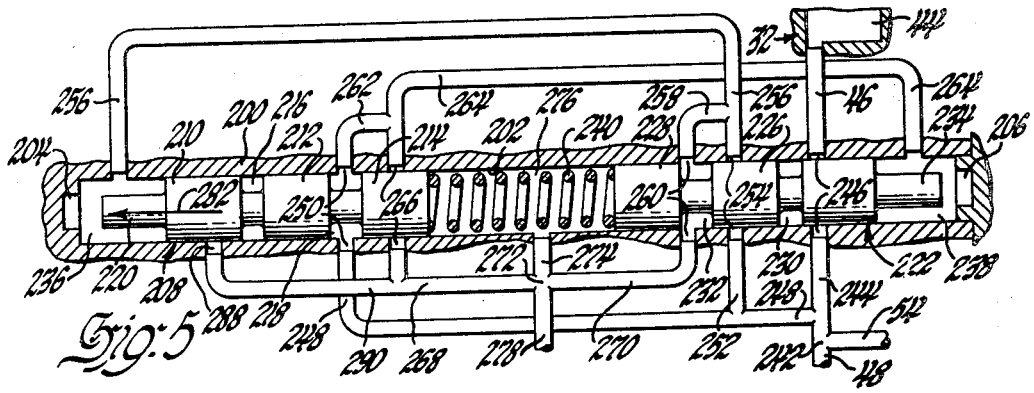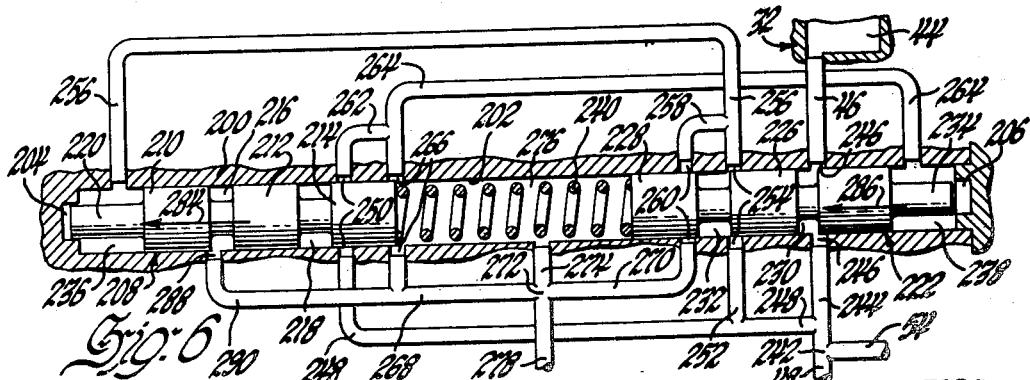

United States Patent Office 3,052,217
Patented Sept. 4, 1962

---

3,052,217
INTERMITTENT PULSE VALVE CONTROL SYSTEM
Stephen A. Denman, Piqua, and Ward Bunker, Dayton, Ohio, assignors to General Motors Corporation, Detroit, Mich., a corporation of Delaware
Original application Sept. 16, 1957, Ser. No. 684,154, now Patent No. 2,976,946, dated Mar. 28, 1961. Divided and this application Nov. 5, 1958, Ser. No. 772,014
1 Claim. (Cl. 121—38)

This application is a division of United States application Serial No. 684,154, filed September 16, 1957, now Patent No. 2,976,946 issued March 28, 1961.

The invention relates to a control system for establishing intermittent pulses in a hydraulic system and more particularly to such a control system in a road speed control mechanism which is hydraulically controlled and actuated. A hydraulic pressure which is responsive to the vehicle speed is utilized to control the governor. This pressure may be obtained by any of several well known means including use of the pressure from the output pump of a typical vehicle transmission having such a pump, providing a separate pump driven by the output shaft of the vehicle or any other shaft which rotates in proportion to vehicle speed, or utilizing any hydraulic pressure source and modifying pressure from the source to obtain a vehicle speed sensitive pressure.

It is desirable to provide a road speed control mechanism which will control the power output of a vehicle engine to limit and/or maintain the vehicle at a preselected speed regardless of road conditions. In order for such a mechanism to be generally acceptable it should also be provided with emergency controls which permit acceleration beyond the preselected maximum speed and deceleration below the preselected speed being maintained. Previous governing type mechanisms have been proposed which use a hydraulic pressure proportional to vehicle speed. Such mechanisms in the past have not been entirely satisfactory in operation, however, since a hysteresis effect was found to exist which contributed to undesirable hunting of the mechanism in the general range of the preselected speed. The mechanism now proposed overcomes these objections by use of a reference pressure to establish the preselected speed with the reference pressure being applied to a sensing valve to act as a no-rate spring. Hysteresis effect of the sensing valve as well as that of the mechanism is found to be further reduced by providing a series of sharp pressure pulses through the reference pressure system instead of a substantially constant pressure application. This may be accomplished by providing a rotary pulse valve or a pulse producing system including a pair of oppositely disposed balancing valves acting on a common spring. While it is desirable to maintain the pulse frequency within limits in order to retain the overall effect of a substantially constant reference pressure, the pulses are operative to reduce the hysteresis effect primarily due to the amplitude of the pulses produced. A mechanism embodying the features of the invention herein disclosed and claimed is operative to maintain accurate control over the road speed of an automotive vehicle within any desirable range.

In the drawings:

FIGURE 1 is a schematic view of the hydraulic system of a road speed control mechanism embodying the invention, with parts broken away and in section;

FIGURE 2 is a partial cross section view of a road speed control mechanism utilizing the invention;

FIGURE 3 is a schematic diagram of an electric control circuit for the mechanism; and FIGURES 4, 5, and 6 illustrate a balancing valve pulse producing system.

In the system shown in FIGURE 1, the pump 10 may be driven by the vehicle transmission and provide main line pressure in conduit 12. A check valve 14 may be provided in conduit 12 to limit the main line pressure to a predetermined maximum value. The main line pressure is transmitted to a centrifugally actuated governor valve 16. Governor pressure which is proportional to the speed of the vehicle is thus obtained in conduit 18. The excess main line pressure from governor valve 16 may be returned to a sump by drain 20. If the pump 10 is driven by the output shaft of a vehicle transmission and is provided with a predetermined constant bleed orifice, the output speed actuated centrifugal valve 16 and the pressure regulator valve 14 can be eliminated. The pressure from such a pump would be proportional to vehicle speed.

Main line pressure is also transmitted to the pilot control valve 22 through conduit 24 and is controlled by valve 22 as it actuates power piston 26. Power piston 26 is reciprocably received within power cylinder 28 which is formed as a portion of casing 30. The position of the servo or pilot control valve 22 is controlled by the error sensing valve mechanism 32. Power piston 26 is connected with lever 34 and is actuable to move that lever to control the position of the vehicle engine carburetor throttle valve through rotation of shaft 36. Movement of lever 34 in a clockwise direction as viewed in FIGURE 1 tends to close the engine throttle valve.

The error sensing valve mechanism 32 comprises a valve piston 38 reciprocably mounted in a valve chamber which includes a governor pressure chamber 40 located on one side of the piston to which governor pressure from conduit 18 is conducted. The stem 42 of error sensing piston 38 extends through and beyond chamber 40 and is mechanically connected with the pilot control valve 22. The other side of piston 38 is exposed to reference chamber 44 to which is connected the reference pressure conduit 46. The reference pressure in chamber 44 is operative as a no-rate spring; i.e., the reference pressure exerts the same force on the face of piston 38 regardless of the position of that piston within the valve mechanism 32. Main line pressure is modified to reference pressure and directed to chamber 44 through conduit 48 and pulse valve 50. The main line pressure is regulated to become the reference pressure by reference pressure regulator valve mechanism 52. Regulation of this valve mechanism establishes the reference pressure within conduit 46 and chamber 44 and the speed adjustment of the road speed control mechanism is thereby determined.

A conduit 54 leading from conduit 48, and also connecting at that point with conduit 46, connects with regulating chamber 56 within reference pressure regulator mechanism 52. Chamber 56 is controlled by reference pressure regulator valve 58. This valve may be comprised of a rubber or other seat 60 and a metal body 62. Valve 58 is biased toward a closed position by a regulator spring 64 which is in turn controlled by speed adjustment screw 66. When the reference pressure in conduit 46 and 54 and chamber 56 exceeds the force applied by spring 64, valve 58 is lifted off its seat and chamber 56 is opened to drain 68 until the reference pressure exactly balances spring 64. A second drain 70 may be provided in pressure regulator mechanism 52 to prevent build-up of pressure in the cavity partially occupied by spring 64. The pulse valve 50 is shown as a rotary intermittent pulse type valve in FIGURE 1 and includes a bushing 72 and a rotary shaft 74 through which a diametrically extending passage 76 is formed. Shaft 74 may be rotated at any desirable speed; for example, from 300 to 3,000 r.p.m. thereby providing intermittent pulses of main line pressure which become reference pressure in the conduit 16 and 54. When the pulse valve is not provided, a hysteresis effect is obtained in the error sensing valve mechanism 32 and the road speed control mechanism will hunt over a range on the order of two or three miles per hour while operating at the controlling speed. Provision of the pulse valve eliminates the hunting of the governor.

Stem 42 of piston 38 is connected to the end of control valve 22 which acts as a pilot valve for the power piston 26. Piston 26 may be provided with an annular passage 78 formed as a groove between the lands on the piston. Passage 78 is adapted to communicate at all times with inlet port 80 in casing 30. Port 80 is connected to the main line pressure conduit 24 and passage 78 is connected to a radial passage 82 formed in piston 26. The inner end of radial passage 82 communicates with an annular port 84 formed as a groove between a pair of lands on control valve 22. A second radial passage 86 is provided in piston 26 and is spaced axially from radial passage 82 and operatively communicates with the chamber 88 formed by the end of piston 26 and a portion of casing 30. Axially disposed passage 90 provides fluid communication between radial passage 86 and chamber 88.

When control valve 22 moves outwardly of power piston 26, the annular port 84 will communicate with the radial passage 86 and the axially disposed passage 90 will supply fluid under pressure to chamber 88. This pressure will act on the end of piston 26 to move that piston outwardly as control valve 22 moves outwardly. Control valve 22 is provided with a second annular port 92 which is adjacent the outer end of the valve and will connect port 86 to exhaust when piston 26 moves outwardly beyond the place where it cuts off fluid communication between annular port 84 and radial passage 86. The port 92 also communicates with an axial passage 94 formed in control valve 22 and terminates in the chamber 96 formed between the inner end of valve 22 and plug wall 98 which closes the end of the control valve passage 100 in piston 26. Passage 94 maintains the chamber 96 at exhaust pressure at all times so that valve 22 may be easily moved without fluid pressure resistance. Port 92 is always in communication with the interior of casing 30.

When power piston 26 moves outwardly with control valve 22, the outer end of piston 26 may engage lever 34. This lever extends radially from and is secured to shaft 36 which is rotatably mounted in a portion of the control casing 30. Rotation of shaft 36 controls the position of the engine throttle. Lever 34 is held against piston 26 by spring 102. This spring resists outward movement of power piston 26 and, when hydraulic pressure is reduced in chamber 88, moves lever 34 counterclockwise as viewed in the drawing. Power piston 26 is therefore returned to the left by action of spring 102.

The illustration of the mechanism of FIGURE 2 is generally similar to the governor control portion of the diagram of FIGURE 1. The passage 104 receives governor pressure and transmits it to governor pressure chamber 106 in the error sensing valve mechanism 108. The valve mechanism 108 has error sensing piston 110 reciprocably mounted therein and defining one wall of governor pressure chamber 106. Stem 112 of piston 110 extends through chamber 106 and is connected with lever 114 which in turn is connected with pilot control valve 116. When piston 110 is moved to the left as viewed in the figure, valve 116 is also moved to the left in direct relation thereto. Reference pressure chamber 118 of valve mechanism 108 is supplied with reference pressure through passage 120 and has one wall formed by the other side of error sensing piston 110. The reference pressure in chamber 118 therefore acts to control movement of pilot control valve 116 in accordance with the speed of the vehicle.

Pilot control valve 116 controls movement of power piston 122. The power piston 122 is mounted for reciprocation within a cylinder 124 formed in casing 126. The power piston may be provided with an annular passage 128 formed as a groove by the lands on the piston. Passage 128 is adapted to communicate at all times with inlet 130 in casing 126. Main line pressure is provided to inlet 130. Passage 128 is also connected to a radial passage 132 formed in piston 122. The inner end of radial passage 132 communicates with an annular port 134 which is formed as a groove between a pair of lands on control valve 116. A second radial passage 136 is provided in piston 122 and is spaced radially and axially from radial passage 132 and operatively communicates with the chamber formed by the end of piston 122 and a portion of casing 126. Axially disposed passage 140 provides fluid communication between radial passage 136 and chamber 138.

When control valve 116 moves outwardly of power piston 122, the annular port 128 will communicate with the radial passage 136 and the axially disposed passage 140 will supply fluid under pressure to chamber 138. This pressure will act on the end of piston 122 to move that piston outwardly as control valve 116 moves outwardly. Control valve 116 is provided with a second annular port 142 which is adjacent the outer end of the valve and will connect passage 136 to exhaust when piston 122 moves outwardly beyond the place where it cuts off fluid communication between annular port 134 and radial passage 136. The port 142 also communicates with an axial passage 144 formed in control valve 116 and terminates in the chamber 146 formed by the inner end of valve 116 and the plug 148 which closes the end of the control valve passage 150 in piston 122. Passage 144 maintains the chamber 148 at exhaust pressure at all times so that valve 116 may be easily moved without fluid pressure resistance. Port 142 is always in communication with the interior of casing 126. A drain port 152 may be positioned in the lower portion of casing 126 and permits the return to the fluid source of all fluid exhausted through port 142.

When power piston 122 moves outwardly with control valve 116, the outer end of piston 122 may engage throttle linkage control fork 154, the ends of which are disposed on opposite sides of the outer end of control valve 116. Fork 154 extends radially from and is secured to a shaft 156 which is rotatably supported in casing 126.

The electric control circuit for the mechanism is shown schematically in FIGURE 3 and includes a battery or other electrical source 158. An electrical lead from the battery is connected through ignition switch 160, fuse 162, and a transmission quadrant safety switch 164 to the three position control switch 166. Switch 166 includes a governor contact 168 and the automatic cruise "on" contact 170. A lead which may be connected in series with governor contact 168 connects through normally closed throttle override switch 172 to the hydraulic servo solenoid valve 174. This valve may be positioned in supply line 24 of FIGURE 1 and is held open by action of the solenoid. A lead connected with contact 170 has normally closed brake switch 176 and the governor cruise switch 178 in series with the cruise lock solenoid 180. When the electrical circuit is completed through switches 160, 164, 170, 176, and 178, the cruise lock solenoid 180 is energized. This solenoid will lock the fuel accelerator pedal in a predetermined position, preferably about ¾ throttle, only when the vehicle has attained the governed cruise speed and the accelerator pedal is advanced to the position in which it is to be locked. This portion of the control system is similar to the road speed control system shown, described, and claimed in the co-pending application, Serial No. 665,091, filed June 11, 1957.

The balancing valve arrangement shown in FIGURES 4 through 6 may be used in place of the rotary pulse valve 50 to produce the intermittent pulses in reference pressure conduit 46 and chamber 44. This assembly is also applicable to other fluid pressure systems in which a pulse pressure is desirable. The valve assembly includes a valve housing 200 in which an axially extending cylindrical valve chamber 202 is formed. The ends of valve chamber 202 are respectively provided with recesses 204 and 206 of generally cylindrical form and of smaller diameter than chamber 202. Valve 208 is positioned in one end of chamber 202 and is formed to include spaced lands 210, 212, and 214 separated by annular grooves 216 and 218. Valve 208 is also provided with an axially extending reduced end 220 which is receivable within recess 204 to provide a dashpot action. Valve 222 is received within the other end of chamber 202 and is provided with spaced lands 224, 226, and 228 defining annular grooves 230 and 232. The valve is provided with an axially extending reduced end 234 which is receivable within recess 206 to provide a dashpot action. Either the recesses 204 and 206 or the reduced ends 220 and 234, or all of them, may be slightly tapered, if desired, to give a variable dashpot action. Valves 208 and 222 are preferably identical, with the valves being disposed to each other within chamber 202 in mirror image relation.

Reduced valve ends 220 and 234 cooperate with housing 200 and lands 210 and 224 respectively to define end chambers 236 and 238. The adjacent ends of the valves are spaced axially apart and have compression spring 240 received between them within chamber 202 and acting against the ends of lands 214 and 228. Fluid under pressure is received through conduit 48 and is preferably main line pressure. Conduit 54 connects with the regulating chamber 56 of reference pressure regulator mechanism 52 and joins conduit 48 at junction 242. Main line pressure is modified to reference pressure at this point. Passage 244 leads from this junction to the port 246 in the balancing valve mechanism adjacent valve 222. When groove 230 of valve 222 is aligned with port 246, the fluid pressure is connected with reference pressure conduit 46 and is transmitted to reference pressure chamber 44 of error sensing valve mechanism 32.

Passage 248 leads from passage 244 and connects with port 250 adjacent valve 208. Passage 252 is connected with passage 248 and leads to port 254 which is adjacent valve 222 and axially inwardly spaced from port 246. Passage 256 leads from port 254 to end chamber 236. Passage 258 connects passages 256 with port 260 which is adjacent but axially inwardly spaced from port 254. Passage 262 connects port 250 with passage 264. Passage 264 connects the port 266, which is axially inwardly spaced from and adjacent port 250, with the end chamber 238. Port 266 is connected with port 260 by passages 268 and 270, at the juncture 272 of which is connected passage 274, leading from the center chamber 276, and the drain passage 278. Drain passage 268 is also connected with port 288 by passage 290.

The sequence of operations is shown in order in FIGURES 4, 5, and 6. FIGURE 4 shows valve 222 at the extreme right hand end of chamber 202 with groove 230 fully connecting passage 244 to conduit 46 through port 246. Reference pressure passes through passages 248 and 252, port 254, groove 232, and passage 256 to end chamber 236. This pressure acts on one side of land 210 of valve 208. This valve, as indicated by arrow 280, is moving to the right as seen in FIGURE 4. Drain passage 278 is connected with passage 274 through which oil being displaced from center chamber 276 is exhausted as valve 208 moves to the right.

Chamber 238 is also opened to exhaust through passage 264, port 266, and passage 268. As valve 208 moves to the right beyond the point shown in FIGURE 4, land 214 closes passage 264 at port 266 and opens passages 248 and 262 through port 250 and groove 218. Reduced end 220 of valve 208 is removed from recess 204. Line pressure then flows through passage 248, port 250, groove 218, and passages 262 and 264 to end chamber 238. The fluid under pressure in chamber 238 acts on the end of land 224 of valve 222, causing that valve to move to the left.

When starting the system after a period of rest, there may be air in some or all of the lines. If there is air in passage 264 and chamber 238, for example, valve 208 may tend to move so far to the right as to cut off the supply of pressure fluid to chamber 238 before the air is exhausted therefrom. This would result in locking valve 223 in the position shown in FIGURE 4. To obviate this difficulty, port 288 is connected with drain passage by passage 290. When valve 208 continues to move to the right under these circumstances, chamber 236 is opened to drain through port 288 and passage 290 before land 212 completely closes port 250. Thus fluid pressure may be introduced into chamber 238 and cause valve 222 to be properly actuated.

After a short interval of movement of valve 222 to the left, land 224 closes port 246, thereby disconnecting passage 244 from conduit 46 and interrupting the supply of reference fluid pressure to reference chamber 44. Land 226 also closes port 254 to disconnect passages 252 and 256. As movement of valve 222 continues to the left, groove 232 cooperates with port 260 to connect passages 258 and 270. In the meantime, valve 208 has moved sufficiently to the right as above described to permit land 214 to close port 266, thereby disconnecting passages 264 and 268. Groove 218 is also aligned with port 250 to connect passages 248 and 262. Pressure fluid now flows through passage 248, port 250, groove 218, and passages 262 and 264 to end chamber 238, thus continuing to supply that chamber with fluid under pressure to continue to move valve 222 to the left to the inner end of its stroke. This condition is shown in FIGURE 5. At this time end chamber 236 is opened to drain through passages 256 and 258, port 260, groove 232, passages 270 and 278. Since end chamber 236 is opened to exhaust and compression spring 240 is acting against the end of land 234, valve 208 is stopped in its movement to the right and is moved to the left as indicated by arrow 282. Valve 222 is momentarily stopped at its inward position shown in FIGURE 5.

As valve 208 continues to move to the left, the mechanism assumes the position shown in FIGURE 6. Land 214 interrupts port 250 to disconnect passage 248 from passage 262, thereby interrupting the supply of fluid pressure to end chamber 238. Land 214 opens port 266 to connect passage 264 with drain passages 268 and 278, permitting the oil in end passage 238 to be exhausted. Spring 240, acting against land 228 of valve 222, now moves that valve to the right. Land 228 closes port 260 to disconnect passages 258 and 270. Land 226 uncovers port 254 to connect passages 252 and 256 through groove 232. Land 224 uncovers port 246 to connect passage 244 with conduit 46, again permitting reference pressure to be transmitted to chamber 44. Arrows 284 and 286 respectively indicate the movement of valves 208 and 222. As the valves 208 and 222 approach their outer stroke limit the reduced ends 220 and 234 enter recesses 204 and 206 respectively. These recesses contain semitrapped fluid and act as dashpots to slow and stop the outward movement of the valves. As the valves reach their extreme outer limits, the condition shown in FIGURE 4 prevails and the cycle is repeated. It is noted that throughout the cycle valve 208 leads valve 222 slightly in its reciprocating movements. Thus the pressure supplied to chamber 4 is pulsed intermittently by hydraulic action and no outside power source is required. The timing of the mechanism may be varied as desired by changing the characteristics of spring 240 and the sizes of various passages as well as the dimensions of the valves themselves.

An intermittent pulse valve control system for a hydraulic road speed control system has been disclosed which will effectively permit control of the speed of a vehicle either to a predetermined maximum or at a predetermined constant speed without the usual hunting or hysteresis effects characteristic of previous hydraulic systems.

What is claimed is:

In a valve control system responsive to a variable pressure and a substantially constant reference pressure, intermittent pulse producing valve means for producing intermittent pressure pulses in said reference pressure, said valve means including a pair of oppositely disposed balancing pulse valves actuated by said reference pressure.

References Cited in the file of this patent
UNITED STATES PATENTS

| | | |
|---|---|---|
| 981,271 | Hutchins | Jan. 10, 1911 |
| 1,822,667 | Proell | Sept. 8, 1931 |
| 2,397,213 | Smith | Mar. 26, 1946 |
| 2,650,615 | Nesham | Sept. 1, 1953 |
| 2,684,732 | Harter | July 27, 1954 |